March 24, 1970 F. M. MINKS 3,502,955
PULSE FORMING CIRCUIT AND CAPACITOR DISCHARGE IGNITION
SYSTEMS THEREWITH
Filed Nov. 3, 1966

INVENTOR
FLOYD M. MINKS
BY
Andrus & Starke
Attorneys 3,502,955
PULSE FORMING CIRCUIT AND CAPACITOR DISCHARGE IGNITION SYSTEMS THEREWITH Floyd M. Minks, Campbellsport, Wis., assignor, by mesne assignments, to Brunswick Corporation, Chicago, Ill., a corporation of Delaware Filed Nov. 3, 1966, Ser. No. 591,835
Int. Cl. H05b *39/04;* H02j *3/02*
U.S. Cl. 320—1 20 Claims

ABSTRACT OF THE DISCLOSURE

A triggered oscillator operated in the current mode is interconnected to discharge a capacitor which is also connected in an output circuit with a transistor and a load. The triggered oscillator is actuated by a gated oscillator having a pair of windings coupled and decoupled by a rotating apertured vane. The gated oscillator includes a transistor having the windings connected to the input element and the output elements and having feedback diode means connected between the input winding and an intermediate point of the output winding. The output circuit of the control oscillator is connected to the input circuit of the current mode oscillator which provides feedback power to maintain the operation of the control oscillator.

Figures 1, 2:
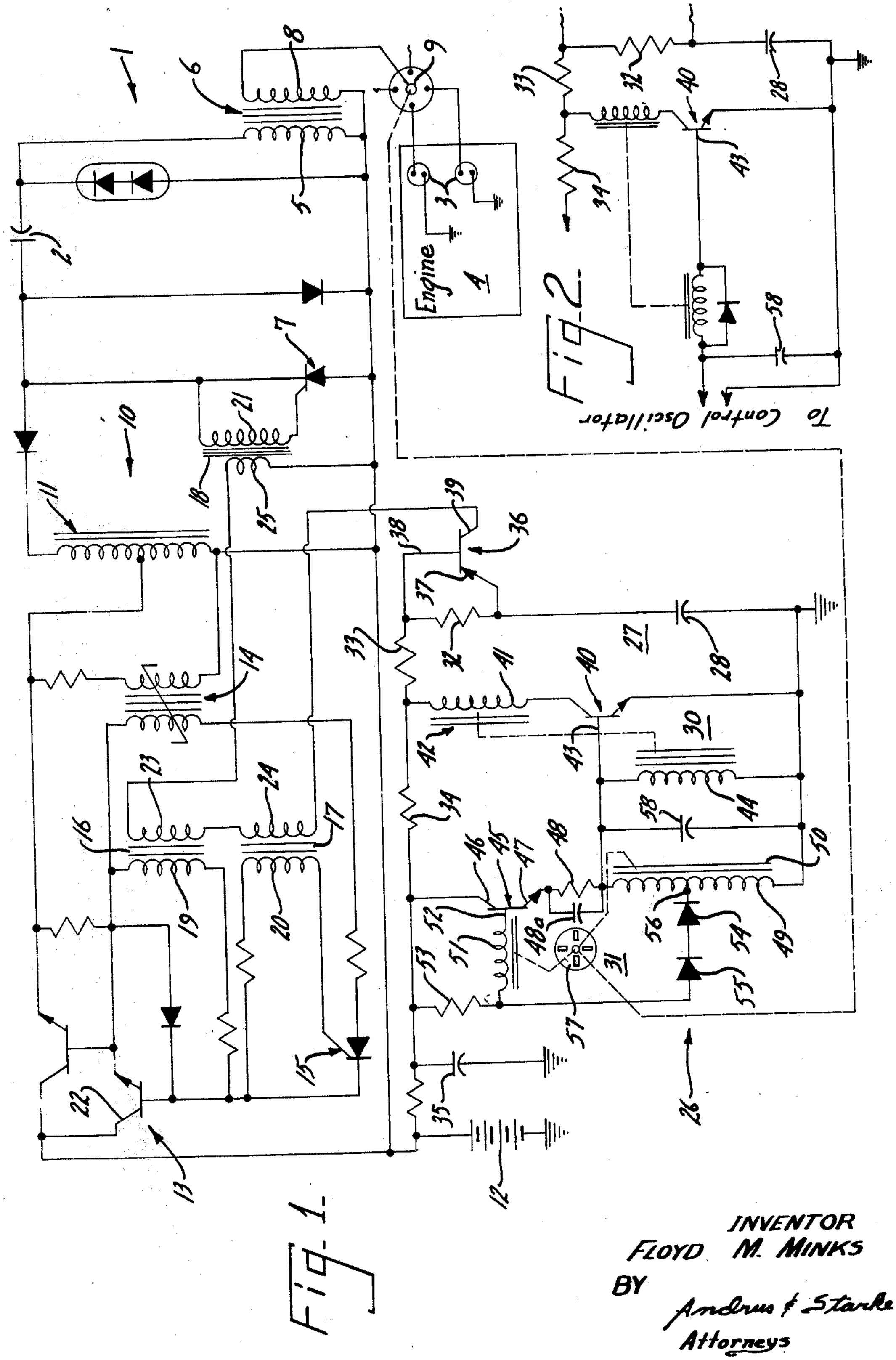

This invention relates to a pulse forming circuit and particularly to a pulse forming circuit adapted to drive a relatively high power trigger load in a capacitor discharge ignition system.

Capacitor discharge systems for operating of the ignition system or forming a part of the ignition system for automobiles or other similar internal-combustion engines have been developed wherein a capacitor is charged to a firing voltage and then discharged through a silicon controlled rectifier in series with means to produce voltage for firing the spark plugs to provide for timed firing thereof. A highly satisfactory capacitor discharge system employing a silicon controlled rectifier or the like is disclosed in applicant's copending application Ser. No. 591,910, filed on Nov. 3, 1966, and now Patent No. 3,395,686, entitled Blocking Oscillator Circuit and Capacitor Discharge System Employing the Blocking Oscillator and in which a highly improved blocking oscillator control circuit is shown for charging of the capacitor.

In this particular circuit, the blocking oscillator includes a compound transistor connection as a switching device in the charging circuit of the oscillator. Further, the input circuit to the oscillator includes a triggered switch means shown as a silicon controlled rectifier connected in the feedback loop. In accordance with the preferred construction as shown in applicant's copending application, the input transistor of the compound connected transistors and the two silicon controlled rectifiers are connected to a common pulse source for simultaneous energization in order to simultaneously establish a charging cycle of the main oscillator and a discharging cycle of the capacitor which has been charged during the previous charging cycle.

The present invention is particularly directed to a solid state electronic pulse forming source providing an accurately controlled on-off output for triggering and which is particularly adapted for firing of solid state ignition systems including the above described application wherein a relatively substantial power requirement is established by the simultaneous triggering of the several elements in the circuit.

Generally, in accordance with the present invention, a triggered oscillator operated in the current mode is interconnected to control the discharge of a capacitor and in a particular embodiment a firing or triggering capacitor which is also connected in an output circuit with a transistor or similar amplifying means and the load means such as the pulsing transformers of the previously described application. The triggered oscillator is connected to a control oscillator which in a novel construction includes a pair of windings interconnected through a rotating or moveable vane adapted to couple and decouple the windings. The control oscillator includes a transistor or the like having the windings connected to the input element and the output elements and having a diode means connected between the input winding and an intermediate point of the output winding. The output circuit of the control oscillator is connected to the input circuit of the current mode oscillator to control or trigger the oscillation thereof. The current transformer of the current mode oscillator provides feedback that tends to maintain the operation of the control oscillator once the control oscillator has triggered the current oscillator into an operating mode.

The present invention provides a very positive on-off type control for generating a single pulse in accordance with the mechanical positioning of a vane member.

The drawing furnished herewith illustrates a preferred construction of the present invention in which the above advantages and features are clearly disclosed as well as others which will be clear from the following description.

In the drawing:

FIG. 1 is a schematic circuit showing the present invention applied to a capacitor discharge ignition system; and FIG. 2 illustrates a modification to one portion of FIG. 1.

Referring to the drawing, the illustrated embodiment of the invention shows a capacitor discharge ignition circuit 1 employing a capacitor 2 connected to selectively fire a plurality of spark plugs 3 of an internal-combustion engine 4. The capacitor 2 is connected in a discharge circuit including the primary winding 5 of a pulse transformer 6 in series with a silicon controlled rectifier 7. The secondary winding 8 of the transformer 6 is connected to the spark plugs 3 by a suitable distributor 9 for sequential application of firing pulses to the spark plugs. The silicon controlled rectifier 7 is fired in timed relation to the operation of the engine 4 to properly apply the firing pulses to the proper spark plug.

The charging circuit for the capacitor 2 includes a blocking oscillator 10 such as disclosed in applicant's previously referred to application wherein an inductor 11 is connected to the battery 12 or other D.C. supply through a compound transistor switching stage 13. The feedback circuit for maintaining a cycle of the blocking oscillator 10 includes a saturable transformer 14 connected to bias the transistor stage in the on condition in series with a silicon controlled rectifier 15. Three pulse transformers 16, 17 and 18 are provided having their secondary windings 19, 20 and 21 connected respectively to bias the one transistor 22 of the switching stage, a trigger or charge cycle control silicon controlled rectifier 15 and the firing silicon controlled rectifier 7. The primaries 23, 24 and 25 of the pulse transformers 16, 17 and 18 are connected in series with each other and to a pulse source 26 which particularly forms the subject matter of the present invention.

The blocking oscillator 10 is more fully developed in applicant's previously referred to application and is only briefly described herein. Generally, when a pulse is established, the pulse transformers 16, 17 and 18 are energized to simultaneously bias the transistor switching stage "on" and to fire the silicon controlled rectifier 15. This initiates a single cycle of the blocking oscillator 10 to store energy in the inductor 11. At a selected output, the saturable feedback transformer 14 is saturated and thereby eliminates the feedback to the switching stage and consequently it turns off. The polarity of the inductor 11 reverses and transfers energy to the capacitor 2 and simultaneously is reflected and resets the saturable transformer 14. When the next pulse is received from source 26, the three pulse transformers 16, 17 and 18 are energized to again initiate a charging cycle of the blocking oscillator 10 and simultaneously fire the main silicon controlled rectifier 7 to discharge the previous charge applied to the capacitor 2.

The pulse source 26 must of necessity provide sufficient energy to simultaneously bias "on" the transistor 22 and fire both silicon controlled rectifiers 7 and 15. Further, it is important that the firing pulses be very accurately and positively determined. The present invention provides a highly reliable and improved means for generating pulses and has been found to be particularly adapted to energization of the capacitor discharge ignition system for internal-combustion engines.

Generally, the pulse source 26 includes an output stage 27 including a small pulsing capacitor 28 adapted to be charged from the battery 12 or the like. A triggered oscillator 30 operated in a current mode is connected to provide or establish an input for the switching of output stage 27 for discharging of the pulsing capacitor 28. The oscillator 30 is controlled by a gated or free-running vane-controlled oscillator 31 which in turn is responsive to the operation of the internal-combustion engine 4 such that the pulse source 26 provides a train of pulses directly related to the operation of the engine 4.

More particularly, the output stage includes the capacitor 28 connected in series with three resistors 32, 33 and 34 across the positive and ground side of the D.C. power supply 12. A filtering capacitor 35 is also connected between the positive side and ground.

A pulse control or output transistor 36 is provided having its emitter 37 connected to the junction of the capacitor 28 and the resistor 32 and its base 38 connected to the junction of the two resistors 32 and 33. The collector 39 is connected to the one side of the series connected primary windings 23, 24 and 25 of the pulse transformers, the opposite side of which is connected to ground, as shown. The charging of the capacitor 28 is from the battery 12 through the resistors 34, 33 and 32 and the capacitor 28 to ground. This establishes a turnoff bias on the pulse control transistor 36 preventing discharge of the capacitor 28 through the pulse transformers.

The oscillator 30, operating in the current mode, functions as a switch to provide a discharge path for the capacitor 28 by essentially grounding of the positive lead through resistor 34. When the capacitor 28 starts to discharge through the resistor 32, it establishes a turn-on bias to the transistor 36 and the main portion of the energy stored in the capacitor 28 discharges through the pulse transformers 23, 24 and 25 to trigger the capacitor discharge ignition system to fire the appropriate spark plug 3 of the engine 4 and simultaneously initiates a charging cycle of the blocking oscillator 10.

The oscillator 30 includes a switching transistor 40 having its emitter-collector circuit connected in series with a primary winding 41 of a coupling or oscillator current transformer 42 to the battery 12, and particularly between the junction of the resistors 34 and 33 and ground. The base 43 is connected in series with a feedback winding 44 of transformer 42 to ground. If a current input is supplied to the base 43, the transistor 40 is biased on and draws current from the capacitor 28 and the battery 12 through the primary winding 41 and the collector-emitter circuit. The current through the primary winding 41 induces a voltage in the feedback winding 44 to establish a turn-on current to the oscillator 30. Thus, by providing a properly timed input current pulse to the base 43, the oscillator 30 is driven into conduction to provide a rapidly acting switch connected directly across the capacitor 28 in series with the voltage dividing resistor 32 to permit the previously described action. The oscillator 30 as previously noted is operated in the current mode with the winding and components so selected such that the current in the windings of coupling transformer are essentially inversely proportional to the turns ratio of the corresponding windings.

The illustrated vane control oscillator 31 includes an amplifying means in the form of a transistor 45 having the collector 46 connected directly to the battery 12 and the emitter 47 connected in series with an emitter bias resistor 48 and the primary winding 49 of an oscillator transformer 50 to ground. A feedback winding 51 coupled to the core of the oscillator transformer 50 is connected in the lead to the base 52. A voltage dividing network consisting of a resistor 53 and a pair of diodes 54 and 55 is connected between the positive side of battery 12 and a tap 56 on the primary winding 49 of the oscillator transformer 50. The diodes 54 and 55 may be a stabistor and provide a constant forward bias across the base to ground circuit. The base emitter resistor 48 provides stabilized operation with temperature and over a substantial voltage range. A stabilizing capacitor 48 may be connected across the resistor 48.

In operation, a rotating apertured disc vane 57 is located between the physically spaced windings 51 and 49 to sequentially couple and decouple the windings. When the windings 49 and 50 are coupled any slight noise in the transistor 45 provides current through the transformer 50 which in turn establishes a proper polarity feedback signal to initiate oscillations which trigger the current mode oscillator 30 to discharge capacitor 28 and turns on the main switching transistor 36.

The current mode oscillator 30 is operated in a mode to not only provide the necessary turn-on current for the switching transistor but to further provide feedback to the output circuit of the control oscillator 26 including the primary winding 49 and a capacitor 58 to tend to maintain operation of the control oscillator. The oscillator 30 therefore forms a load circuit establishing a positive impedance at low level operation of the control oscillator and a negative impedance at the higher level which fires the oscillator 30. The position of vane 57 is therefore quite different for each state and there is no point of unstable operation. This provides a very positive switching action.

When the vane rotates to space the aperture from alignment with the windings 49 and 51, the feedback windings are effectively decoupled and feedback is eliminated thus turning off the control oscillator and allowing the capacitor 28 to recharge.

In summary, it is assumed that the vane 51 is aligned to decouple the two windings 49 and 51 of the control oscillator 31. As a result, the battery 12 provides a charging current through the resistors 32, 33 and 34 to charge the capacitor 28. The vane 57 rotates with the distributor 9 and aligns an aperture with the windings 49 and 51. This provides a reversal from negative to positive feedback current to the base circuit to activate the control oscillator 31 as long as the windings are sufficiently coupled. When the output of the control oscillator 31 reaches approximately six-tenths of a volt, the level normally required to turn on a silicon transistor, the oscillator 30 is triggered on. The oscillator 30 provides a low impedance discharge path for the capacitor 28. As a result, the capacitor 28 discharges through the resistor 27 and the primary winding 41 and establishes a feedback or turn-on bias in the feedback winding 44 of the oscillator 30 to turn on the oscillator and simultaneously provide power back to the output circuit of the free running control oscillator 31 to insure that it is maintained in the "on" condition during the time that the windings are coupled.

The bias voltage across the resistor 32 forward biases the transistor 36 which conducts and discharges the primary energy of the capacitor 28 through the primary windings 23, 24 and 25 of the pulse transformers simultaneously generating three turn-on pulses in the secondary windings. As a result, the main blocking oscillator 10 is triggered to establish an inductor charging cycle and the silicon controlled rectifier 7 is fired to discharge the previously stored energy in the main capacitor 2.

The current mode oscillator 30 provides a very rapidly acting switch such that once biased on, it positively turns on to rapidly discharge the capacitor 28. The rapid action is highly desirable particularly for triggering a capacitor discharge system as it prevents possible dragging down of the charge on the pulse transformer such as encountered when applying a slowly rising signal to the transistors.

In summary, the capacitor charges relatively slowly and discharges very rapidly to provide a highly desirable high power pulse for firing of the several silicon controlled rectifiers and biasing on the transistor. An ignition system constructed in accordance with this invention has been operated under severe temperature variations and voltage variations and has been found to provide a highly reliable and repeatable pulse source for firing of and control of the main blocking oscillator and the discharging of the main capacitor.

An alternative construction of the current mode oscillator 30 is shown in FIG. 2, with the elements corresponding to those of FIG. 1 similarly numbered for simplicity and clarity of explanation.

In FIG. 2, the coupling oscillator transformer 42 has a winding 59 connected in the collector lead of transistor 40. A feedback winding 60 of transformer 42 is series connected between the control oscillator 31 and the base 43 of the transistor. A diode 61 is connected across the winding 62 to conduct when the triggered oscillator turns off as the circuit of FIG. 2 does not provide the low impedance path through the capacitor 58 as in the circuit FIG. 1.

Generally, the oscillator 30 of FIG. 2 functions as a current transformer in the same general manner as that of FIG. 1. However, it does not provide the negative resistance characteristic and the resulting advantages.

The present invention has been found to provide a highly reliable and commercially practical switching circuit which is particularly adapted to semiconductor ignition systems of the capacitor discharge type.

I claim:

1. In a pulse forming circuit,
- a power supply input connection means,
- a capacitor,
- current limiting means connecting said capacitor to said input connection means to define a charging circuit,
- a load connection means,
- an amplifying means connected in series with said capacitor and said load means defining a first discharge path for the capacitor, said amplifying means having input means,
- a triggered oscillator having oscillator amplifying means with an input circuit loop and an output circuit loop and a coupling transformer having a winding means in said input circuit loop and a winding means in the output circuit loop, said transformer functioning as a current transformer and said output circuit loop including the capacitor and the input means of the first named amplifying means to provide a second discharge path for said capacitor, and means to periodically fire the oscillator.

2. The pulse forming circuit of claim 1 wherein said last named means is a gated oscillator.

3. The pulse forming circuit of claim 2 wherein the gated oscillator includes a transformer having an output winding connected in an output circuit connected to the input circuit loop of the triggered oscillator and a feedback winding connected in a feedback loop and means to vary the coupling of the windings to alternately establish and terminate oscillations.

4. The pulse forming circuit or claim 2 having a capacitor connected in parallel with said output winding.

5. The pulse forming circuit of claim 3 wherein the means to vary the coupling of the windings is a rotating disc having alternate areas of conductive and nonconductive material sequentially interposed between said windings.

6. The pulse forming circuit of claim 3 wherein a portion of the output winding is connected in the feedback loop.

7. In the pulse forming circuit of claim 1 wherein the triggered oscillator includes a transistor having an input element, an output element and a common input-output element,
- said first named winding means being connected across the input element and the common input-output element, and
- said second named winding means being connected in series with the output element.

8. The pulse forming circuit of claim 7 wherein the means to periodically fire the oscillator comprises a gated oscillator having a mechanical means to periodically turn the gated oscillator on and off.

9. The pulse forming circuit of claim 8 wherein the gated oscillator includes a transistor having an input element, an output element and a common input-output element,
- an output winding connected in series with the output elements, said output winding being connected to periodically fire the triggered oscillator,
- a feedback winding connected in a loop series circuit including the input elements of the transistor and a diode means and a portion of the output winding to establish a precise turn-on and turn-off of the gated oscillator, and
- means to periodically couple and decouple said windings.

10. The pulse forming circuit of claim 1 wherein the means to periodically fire the triggered oscillator is a gated oscillator having an output means, and the triggered oscillator includes,
- a transistor having an input element, an output element and a common input-output element,
- said first named winding means being series connected with the input element and the output means of the gated oscillator,
- a diode connected across the first named winding means and polarized to conduct during the off portion of the cycle of the triggered oscillator, and
- said second named winding means being connected in series with the output element.

11. In a pulse forming circuit including a capacitive storage means connected in a charging circuit and a discharging circuit having an electronic switch means, said charging circuit having a selected time constant, the improvement in a solid state switch means connected across the capacitor and discharging circuit and operable to trigger said switch means, comprising,
- a triggered oscillator including a transformer operating in a current mode, said oscillator having an input circuit, and
- a control oscillator connected to the input circuit and having means to periodically fire the control oscillator.

12. A control circuit,
- a gated oscillator having an output means and having a mechanically moving means to turn the oscillator on and off, and
- a load circuit connected to the output means and establishing a positive impedance at a low level of the oscillator and a negative impedance at another higher level of the oscillator, such that the position of the mechanical means for turning on the oscillator to a specified level is appreciably different than the position to turn the oscillator off from said specified level.

13. The control circuit of claim 12 wherein said load circuit includes a triggered oscillator having an amplifying means having an input means and an output means and a coupling transformer with a feedback winding connected across the input means and the output means of the gated oscillator.

14. A gated oscillator, a pair of input power connection means, a transistor having a collector connected to one of said power connection means, and having an emitter and a base, an oscillator transformer having a base winding means connected in series with the base and an emitter winding means connected in series with the emitter to the other of said power connection means, a coupling means to periodically couple and decouple the winding means, a resistance means connected between the base and one of the power connection means, and a diode means connected between the base winding and an intermediate point on the emitter winding means.

15. In an ignition system employing a capacitor periodically discharged through a load means to fire an engine, a trigger means for controlling the discharge of the capacitor including a trigged oscillator having amplifying means with input elements connected in an input loop and output elements connected in an output circuit loop, and a coupling transformer having a winding means connected in circuit with said loops to function as a current transformer such that the currents in the windings are essentially inversely proportional to the turns ratios of the corresponding windings.

16. The ignition system of claim 15 wherein said capacitor is connected as a part of the output loop and whereby said oscillator derives power from said capacitor and controls the discharge of said capacitor through the load means.

17. The ignition system of claim 15 having a gated oscillator connected to the input circuit of the triggered oscillator and having means to periodically actuate the gated oscillator to conduct and establish a cycle of the triggered oscillator.

18. The semiconductor ignition system of claim 17 wherein, said gated oscillator includes a transistor having an output element, an input element and a common input-output element and an oscillator transformer having a winding in series with the output element and the common input-output element and a second winding in series with the input element, and said triggered oscillator includes a transistor having an input circuit and an output circuit an an oscillator transformer having a first winding connected in the output circuit loop and a feedback winding connected across the input circuit loop.

19. The semiconductor ignition system of claim 18 having means to vary the coupling of the windings of the oscillator transformer of the gated oscillator to alternately established and terminate oscillations.

20. A control gated oscillator having an output winding coupled with a feedback winding and a movable vane to couple and decoupled the windings, a negative feedback means connected between the output winding and the feedback winding and establishing a negative feedback greater than the coupling of the winding with the vane in a decoupling position whereby there is a change from negative to positive feedback as the vane moves thereby establishing a positive turn-on and turn-off of the gated oscillator.

References Cited

UNITED STATES PATENTS

| | | | |
|---|---|---|---|
| 3,241,538 | 3/1966 | Hugenholtz | 315—218 X |
| 3,253,185 | 5/1966 | Morrison | 123—148 |
| 3,277,340 | 10/1966 | Jukes et al. | 315—218 X |
| 3,277,875 | 10/1966 | Miki | 123—148 X |
| 3,331,986 | 7/1967 | Hardin et al. | 123—148 X |

BERNARD KONICK, Primary Examiner

JOSEPH F. BREIMAYER, Assistant Examiner

U.S. Cl. X.R.

123—148; 315—218; 331—47, 54, 181